United States Patent
Litwin, Jr. et al.

(10) Patent No.: US 6,577,231 B2
(45) Date of Patent: Jun. 10, 2003

(54) CLOCK SYNCHRONIZATION OVER A POWERLINE MODEM NETWORK FOR MULTIPLE DEVICES

(75) Inventors: Louis Robert Litwin, Jr., Plainsboro, NJ (US); Kumar Ramaswamy, Plainsboro, NJ (US)

(73) Assignee: Thomson Licensing SA, Boulogne Cedex (FR)

( * ) Notice: Subject to any disclaimer, the term of this patent is extended or adjusted under 35 U.S.C. 154(b) by 0 days.

(21) Appl. No.: 09/825,233

(22) Filed: Apr. 3, 2001

(65) Prior Publication Data

US 2002/0140547 A1 Oct. 3, 2002

(51) Int. Cl.[7] .............................................. H04M 11/04
(52) U.S. Cl. .................................... 340/310.01; 368/46
(58) Field of Search ...................... 340/310.01, 309.15; 368/46, 52, 47, 59, 1, 184, 185, 204; 968/920

(56) References Cited

U.S. PATENT DOCUMENTS

| | | | | | |
|---|---|---|---|---|---|
| 4,490,050 A | * | 12/1984 | Singhi | ........................ | 368/46 |
| 5,334,975 A | * | 8/1994 | Wachob | ................. | 340/310.01 |
| 5,557,585 A | * | 9/1996 | Hanai | .......................... | 368/43 |
| 5,848,028 A | * | 12/1998 | Burklin | ....................... | 368/48 |
| 5,991,240 A | * | 11/1999 | Van Ryzin | .................... | 368/47 |
| 6,111,889 A | * | 8/2000 | Osada | ........................ | 370/461 |

* cited by examiner

Primary Examiner—Anh La
(74) Attorney, Agent, or Firm—Joseph S. Tripoli; Harvey D. Fried; Joseph J. Kolodka

(57) ABSTRACT

An apparatus and method of clock synchronization of a powerline modem network for a plurality of devices are provided. A plurality of devices are provided having a powerline modem and a clock (100). The powerline modem permits communication between the plurality of devices over a powerline network. A synchronization message is provided over the powerline network (102). The synchronization message includes an instruction for each of the plurality of devices to update their clock in accordance with a clock time provided in the synchronization message (104). A synchronization device may be provided to update device clocks on a powerline network.

12 Claims, 4 Drawing Sheets

CLOCK SYNCHRONIZATION OVER A POWERLINE MODEM NETWORK FOR MULTIPLE DEVICES

BACKGROUND

1. Technical Field

This disclosure relates to power-line modem networks, and more particularly, to an apparatus and method for providing clock synchronization to devices in a power-line modem network.

2. Description of the Related Art

Many household devices includes memory and built-in clocks. For example, microwave ovens, VCRs, etc. include a clock readout. Power failures (due to storms, for example) can cause these devices to lose their time. Since so many devices include different programming systems, to correct the time on all of these devices can be annoying and time consuming. In addition, clocks in these different devices tend to drift, and a user can have devices that display different times throughout the house, often differing by several minutes.

Therefore, a need exists for a synchronization method, which permits all devices at a location to be synchronized without individually programming each device. A further need exists for a synchronization method, which eliminates clock drift or time discrepancies between devices at a location.

SUMMARY OF THE INVENTION

A method of clock synchronization of a powerline modem network for a plurality of devices include providing a plurality of devices having a powerline modem and a clock. The powerline modem permits communication between the plurality of devices over a powerline network. A synchronization message is provided over the powerline network. The synchronization message includes an instruction for each of the plurality of devices to update their clock in accordance with a clock time provided in the synchronization message.

In other methods, the step of providing a synchronization message may include providing the synchronization message after an interval of elapsed time. The step of providing a synchronization message may include providing the synchronization message after a power outage. The step of providing a synchronization message may include providing a synchronization device having a back-up battery and maintaining time during a power outage. The method may include the step of updating a clock on the synchronization device by invoking an external clock source. The step of providing a synchronization message may include providing the synchronization by a computer.

A synchronization device may be provided to update device clocks on a powerline network. The synchronization device includes a plug, which connects to a powerline network and powers the synchronization device. A clock maintains time on the synchronization device. A powerline modem is coupled to the plug, which sends a synchronization message to devices with clocks in the powerline network. The synchronization message enables the devices to update their clocks in accordance with the clock of the synchronization device.

In other embodiments, a battery may be included which powers the clock of the synchronization device to maintain the time during a power outage. The synchronization device may include a timing circuit, which measures elapsed time to enable reissuance of the synchronization message. The synchronization device may include a receiver, which receives a time from an external source to update the clock of the synchronization device. The devices with clocks may include at least one of a media player, a television, an answering machine, a thermostat, a clock, a stereo, a microwave and a security system.

These and other objects, features and advantages of the present invention will become apparent from the following detailed description of illustrative embodiments thereof, which is to be read in connection with the accompanying drawings.

BRIEF DESCRIPTION OF DRAWINGS

This disclosure will present in detail the following description of preferred embodiments with reference to the following figures wherein.

DETAILED DESCRIPTION OF PREFERRED EMBODIMENTS

The present invention provides methods for a user to synchronize clocks on several devices (e.g., microwaves, alarm clocks, VCRs, etc.) after a power failure and also to prevent clock drift. This may be accomplished by incorporating inexpensive powerline modems into each of the devices. A time synchronization message from a master device (e.g., a user-appointed master device) or controller (e.g., a personal computer) on the network is employed to update the devices on the network.

Powerline modems communicate by employing a power network as a transmission medium. Powerline modems are employed on a device to set up communication with a master device or controller. Communication carried out on the powerline provides the capability of any plug-in device to communicate on the powerline network. Since modems in a plurality of locations may share the power network, a shared powerline permits devices at a single or multiple locations to "see" the powerline modems (and their data) at the same and other locations, for example, other homes.

Figure 1:
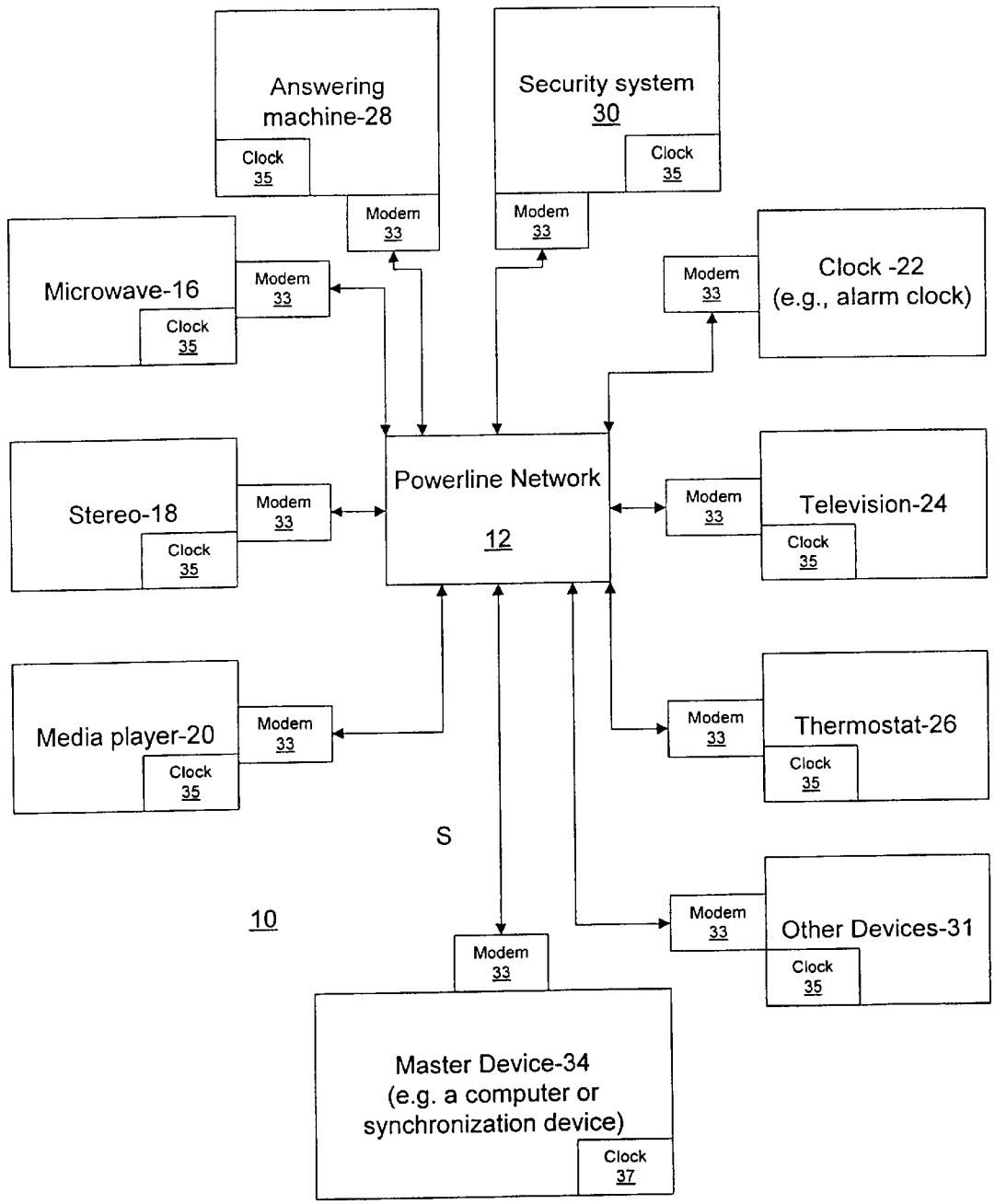
FIG. 1 is a block diagram showing a system for synchronizing a powerline network in accordance with the present invention.

Referring now in specific detail to the drawings in which like reference numerals identify similar or identical elements throughout the several views, and initially to FIG. 1, a block diagram of an illustrative network 10 is shown in accordance with the present invention. A powerline network 12, which may include a hardwired electrical power system for a home or building, is connected to each of a plurality of devices. These devices may include a microwave 16, a stereo 18, a VCR/DVD or other media player 20, an alarm clock 22, a television 24, a programmable thermostat 26, an answering machine 28, an alarm or security system 30, or any other clock devices 31 which plug into the electrical power system. This list is not exhaustive and other devices are contemplated by the present invention. Each device includes a powerline modem 33, which permits communication between these devices themselves and/or a master device 34. Each device also includes a clock 35 which may be subjected to clock drift or time loss during a power failure.

Figure 2:
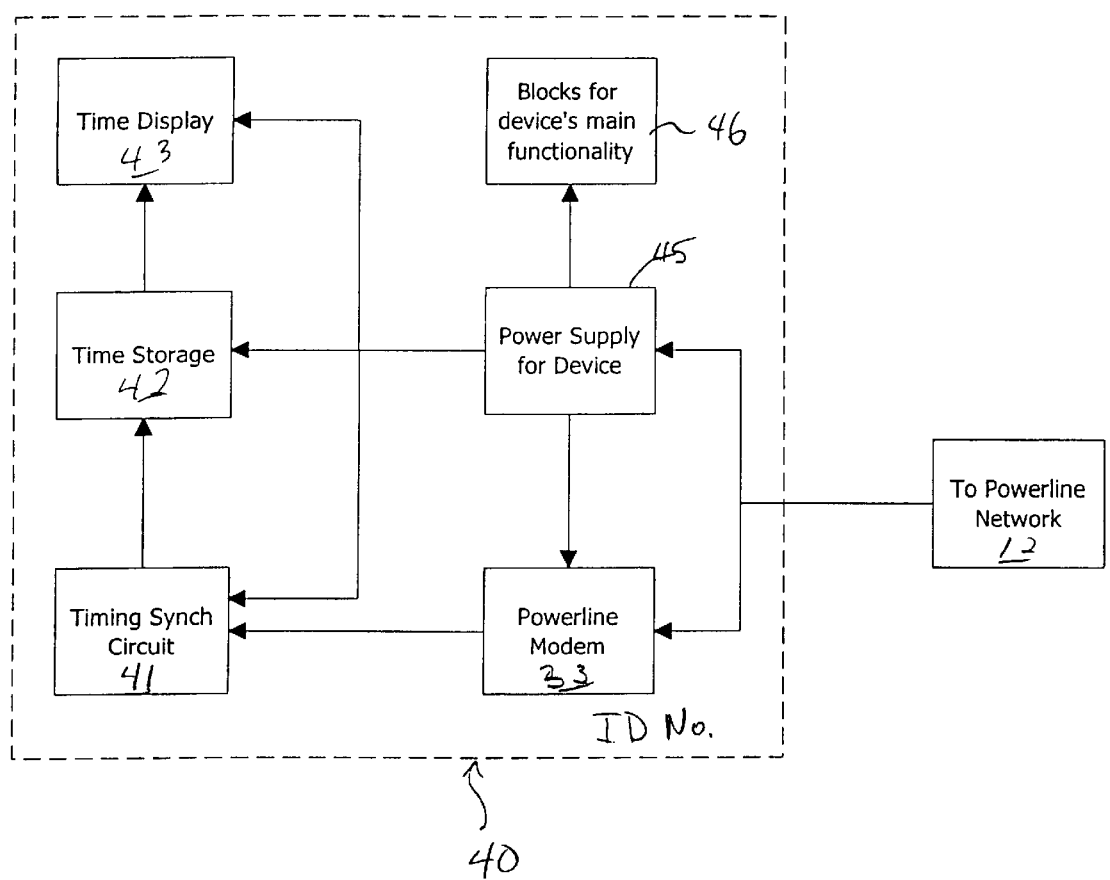
FIG. 2 is a block diagram showing a device having a clock to be updated in accordance with an embodiment of the present invention.

Master device 34 may include a personal computer or a synchronization device 50 (see FIG. 2). Master device 34 maintains its time during power failures because of a batter-backup and is employed to send out messages using its own powerline modem 33. Master device sends out a synchronization message S over powerline network 12 so that the current time can be transmitted to the plurality of devices connected to powerline network 12. These devices will then load the new time into their clocks in accordance with clock 37 (or clock 56 in FIG. 2). This can be used to reset the time after a power failure as well as to provide a periodic time synchronization to prevent clocks 35 from drifting. Message S is compatible with a protocol of powerline modems 33. Powerline communication may be carried out in a way known to those skilled in the art. Each device may include a programmed software algorithm or a clock register, which is updated when message S is sent. In this way, each clock 35 is updated upon receipt of message S. Message S may be issued periodically to eliminate clock drift and may be issued after a power failure.

Figure 3:
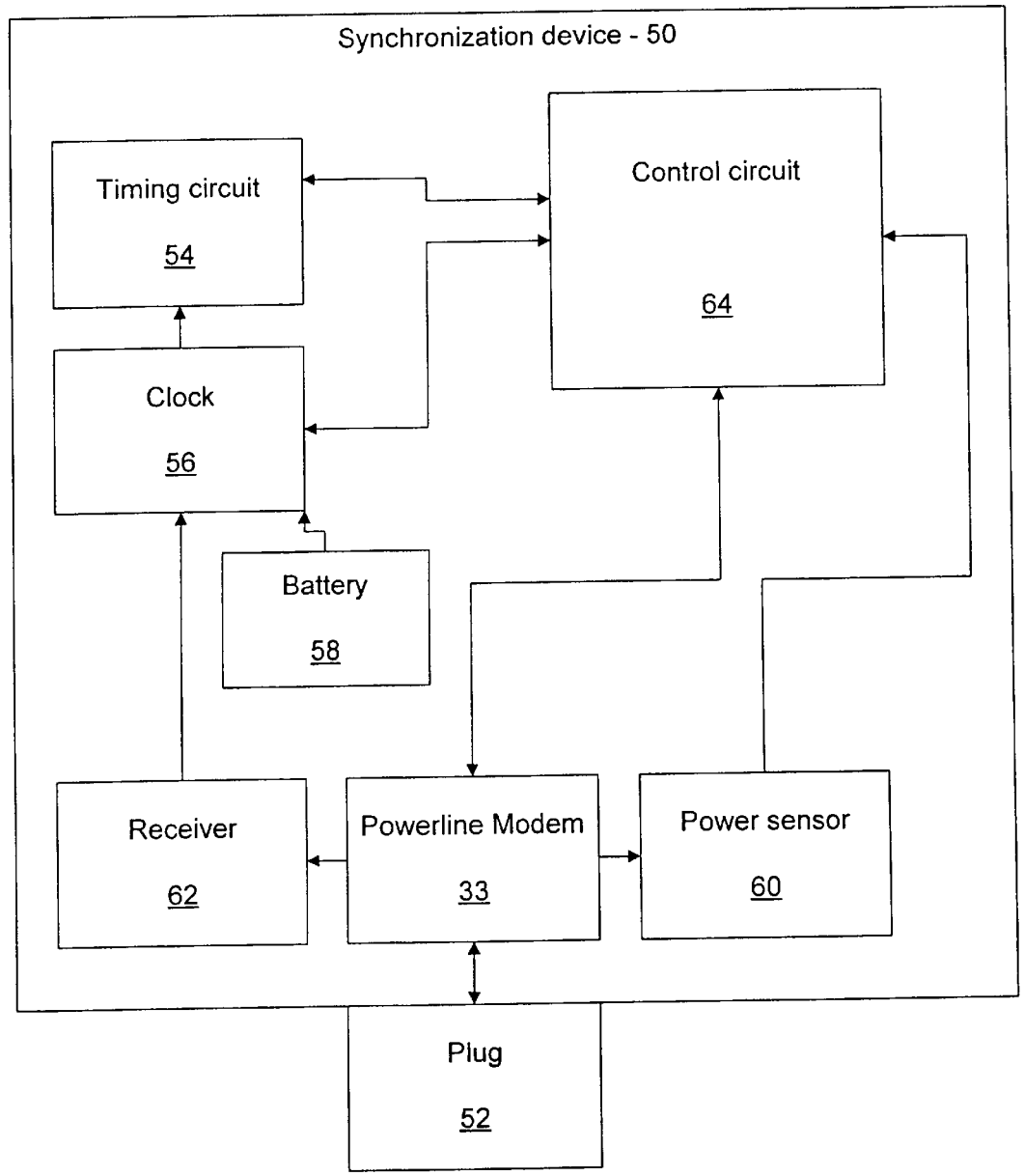
FIG. 3 is a block diagram showing a synchronization device in accordance with an embodiment of the present invention.

Each device in the system may have a clock resolution that maybe different from a synchronizing device 34 or 50 (FIG. 3). While the synchronization device 34 provides a certain resolution (preferably the highest resolution in the system), the devices themselves may have a mechanism to interpret this information to update their own clocks, which may have a different resolution. In one embodiment, this can be accomplished by dropping the lower order bits, which specify the resolution of the clock signal.

Referring to FIG. 2, a receiver device 40, such as one of devices 16–31 in FIG. 1, includes a powerline modem 33 connected to powerline network 12. Powerline modems 33 preferably include an embedded processor. The processor of powerline modem 33 can run software whose functions include, but are not limited to, data modulation/demodulation as well as upper-layer network functions such as packet processing. A software routine can be added that processes the clock synchronization message S and extracts the current time in a timing synch circuit 41. The method by which the current time is transferred to a device clock 42 depends on the implementation of the device. Circuit updates time storage 42 in accordance with the time in message S. The time in time storage 42 is displayed in time display 43. The device 40 includes other circuitry for the main functions of device, such as microwave functions (for microwave ovens), display functions (for TVs), etc. Also, a power supply 45 is employed to provide power to time storage 42, powerline modem 33, and main circuits 46.

One possible embodiment for updated a clock on a device may include sending an interrupt to a microprocessor or timing synch circuit 41 in the device that is responsible for handling time-keeping and clock display functions. An alternative embodiment may include sending the current time directly over a bus to the timer circuit responsible for time keeping in the device.

Referring to FIG. 3, synchronization device 50 may be provided to synchronize powerline network 12. Synchronization device 50 includes a powerline modem 33, which is capable of communication with other devices having powerline modems. Synchronization device 50 may be directly plugged into an electrical power system, using plug 52. Synchronization device 50 includes a timing circuit 54 which measures time intervals for issuance of message S. Synchronization device 50 includes a clock 56 used to maintain the time for network 10 (FIG. 1). Synchronization device 50 includes a back-up battery 58 which ensures that clock 56 will maintain its time even during a power outage. In one embodiment, synchronization device 50 may include a power sensor 60, which senses when power is returned. Message S may be triggered by the switching off/on of power in network 12. A control circuit 64 may be employed to control the issuance of synchronization messages. For example, when a predetermined time has elapsed in timing circuit 54, control circuit is prompted to send the synchronization message to powerline network 12 (FIG. 1). the time on clock 56 is sent to each of the devices on the network 12 to update their clocks (35). Control circuit 64 may include a processor and/or memory to store communication protocols for communications with devices on the powerline network.

In one embodiment, synchronization device 50 may be about the size of a night light. In other embodiments, synchronization device 50 may include a receiver device 62 which receives broadcast radio or satellite signals. In this way, clock 56 of device 50 may be updated in accordance with an external time source. This may be provided in addition to or instead of battery back up 58.

Synchronizing device 50 needs to have a pre-correction (e.g., a programmable pre-correction) applied to the clock signal to account for the time used when device 50 issues the S command and the command appears on the network. The pre-correction of device 50 needs to account for the processing delay in, e.g., circuit 64 or modem 33. In addition, each device, e.g., devices 16–30 in FIG. 1 needs to account for the delay in its own processing chain before it makes the actual clock correction. In many applications, this small delay may not be important while it may be important in others.

A broadcast method of clock updating has been described. However, in alternate embodiments selective updating of clocks in particular devices may be performed by using feedback from each of the specific devices (e.g. devices 1–31 in FIG. 1). In one embodiment, each device may request a clock update from a synchronization device (34 or 50), for example, after a predetermined time has elapsed, etc. The request from the device with the clock to be updated invokes message S. This method may employ addressing all devices individually. These devices may be employed with the capability of registering themselves to a master device on, for example, initial power up. The master device may need to assign an ID code to the devices with clocks which need to be updated in this case or the devices with clocks could come with a preprogrammed ID number (which may be dependant on manufacturers and products across several industries) (see FIG. 2). In one example, universal nomenclature of unique Internet Protocol version 6 (IPv6) (a 128 bit address) may be assigned to all electronic devices in the world. In this application, although such an address exists, the device may never understand the IPv6 protocol but may use the address for performing unique functions in a network.

Figure 4:
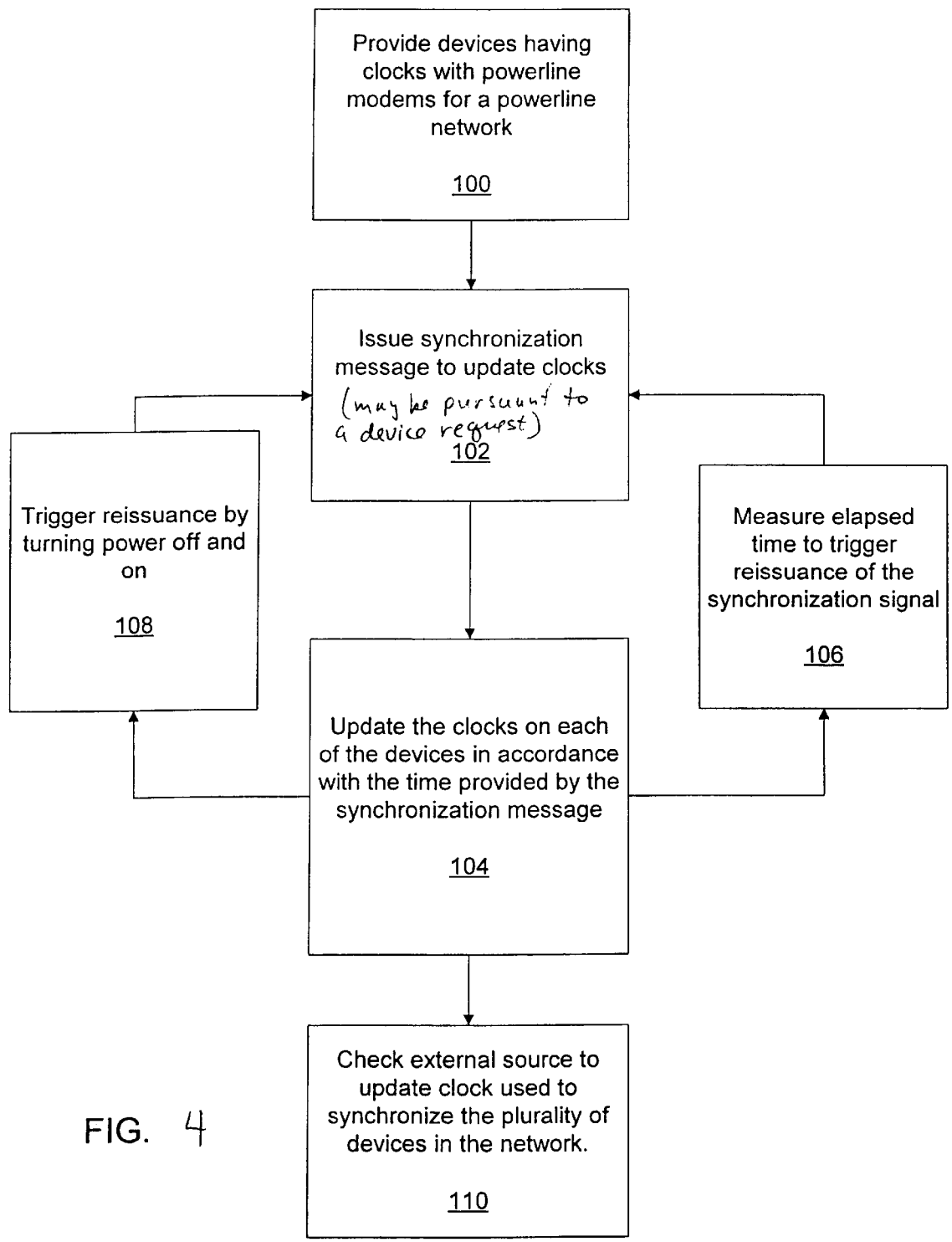
FIG. 4 is a flow diagram showing a method for synchronizing a powerline network in accordance with the present invention.

Referring to FIG. 4, a flow diagram describing a method for synchronizing a powerline network is shown. In block 100, a power line network is provided which includes a plurality of devices with clocks and powerline modems. In block 102, clocks within the network are updated by the issuance of a synchronization message from a master device. In block 104, the synchronization message enables all the devices with clocks to update their clocks in accordance with a time provided by the synchronization message. Message S may be issued following a request by one of the plurality of devices in the network needing an update. In block 106, time is measured so that the synchronization message can be reissued from block 102 after a predetermined amount of time has elapsed. Block 108 may be included to provide reissuance of the synchronization signal upon switching off and on of power to the network. In an alternate embodiment, the time clock on the master device may be checked against an external source (e.g., radio or satellite) and updated accordingly in block 110.

Having described preferred embodiments for clock synchronization over a powerline modem network for multiple devices (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A method of clock synchronization of a powerline modem network for a plurality of devices, comprising the steps of:

providing a plurality of devices having a powerline modem and a clock, the powerline modem operable for digital communication and communication between the plurality of devices over a powerline network; and providing a synchronization message over the powerline network from a local master device the synchronization message including an instruction for each of the plurality of devices to update their clock in accordance with a clock time provided in the synchronization message.

2. The method as recited in claim 1, wherein the step of providing a synchronization message includes providing the synchronization message after an interval of elapsed time.

3. The method as recited in claim 1, wherein the step of providing a synchronization message includes providing the synchronization message after a power outage.

4. The method as recited in claim 1, further comprising the step of updating a clock on the synchronization device by invoking an external clock source.

5. The method as recited in claim 1, wherein the step of providing a synchronization message includes the steps of requesting the synchronization message by one of the plurality of devices and issuing the synchronization message in accordance with the request.

6. A synchronization device to update device clocks on a powerline network, comprising:

a plug which connects to a powerline network and powers the synchronization device;

a clock which maintains time;

a powerline modem of a local master device coupled to the plug, said powerline modem operable for digital communication and sending a synchronization message to devices with clocks in the powerline network, the synchronization message enables the devices to update their clocks in accordance with the clock of the synchronization device.

7. The synchronization device as recited in claim 6, further comprising a battery which powers the clock of the synchronization device to maintain the time during a power outage.

8. The synchronization device as recited in claim 6, further comprising a timing circuit, which measures elapsed time to enable reissuance of the synchronization message.

9. The synchronization device as recited in claim 6, further comprising a receiver, which receives a time from an external source to update the clock of the synchronization device.

10. The synchronization device as recited in claim 6, wherein the devices with clocks include at least one of a media player, a television, an answering machine, a thermostat, a clock, a stereo, a microwave and a security system.

11. A method of clock synchronization of a powerline modem network for a plurality of devices, comprising the steps of:

providing a plurality of devices having a powerline modem and a clock, the powerline modem permitting communication between the plurality of devices over a powerline network;

requesting a synchronization message by one of the plurality of devices;

providing the synchronization message over the powerline network from a local master device in accordance with said step of requesting, the synchronization message including an instruction for each of the plurality of devices to update their clock in accordance with a clock time provided in the synchronization message.

12. A synchronization device to update device clocks on a powerline network, comprising:

a plug which connects to a powerline network and powers the synchronization device;

a clock which maintains time;

a powerline modem of a local master device coupled to the plug, which is operable to issue a synchronization message to devices with clocks in the powerline network in response to and in accordance with a request for the synchronization message by at least one of the devices in the powerline network, the synchronization message enabling the devices to update their clocks in accordance with the clock of the synchronization device.

\* \* \* \* \*